July 8, 1969    M. H. MEHR    3,454,920
ISOMETRIC CONTROL DEVICE
Filed March 10, 1967
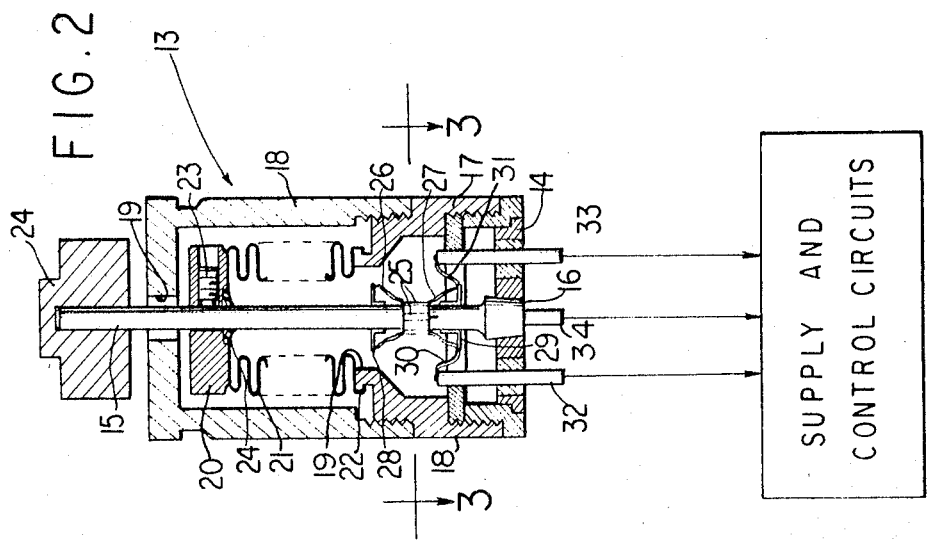
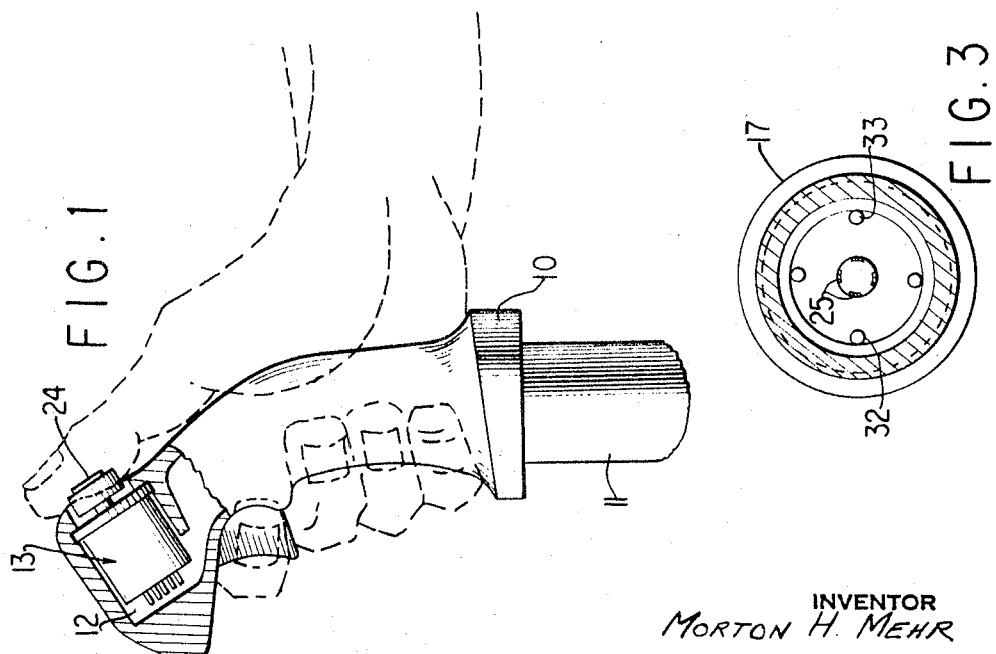
INVENTOR
MORTON H. MEHR
BY
Smythe & Moore
ATTORNEYS

United States Patent Office 3,454,920
Patented July 8, 1969

3,454,920
ISOMETRIC CONTROL DEVICE
Morton H. Mehr, Norwalk, Conn., assignor to Measurement Systems, Inc., Norwalk, Conn., a corporation of Connecticut
Filed Mar. 10, 1967, Ser. No. 628,209
Int. Cl. G01l 1/22
U.S. Cl. 338—5                                       4 Claims

ABSTRACT OF THE DISCLOSURE

A device for isometric control purposes having a bendable shaft with pairs of strain gauges arranged therearound, the free end of the shaft being operable by the thumb or a finger.

---

This invention relates to manually operated controls of the force-operated or "stiff-stick" type for the isometric operation of controlled devices.

Controls of this type have been previously proposed and are useful in fire control, radar and other tracking systems, in the control of machine tools, cranes or other vehicular equipment, and in other applications wherein one object should follow another. Such prior devices, however, are either hand-gripped or depend upon capacitative or like elements which are subject to displacement by shock, jarring or temperature differences and may vary in their operating characteristics during continued use. Also, they have been of relatively heavy weight and not entirely satisfactory for the aircraft and aerospace industry.

One of the objects of the present invention is the provision of a finger-operated isometric control device which avoids the disadvantages of prior devices.

Another object of the invention is the provision of a light-weight, accurate and relatively simple isometric control device of the force-operated or "stiff-stick" type which may be readily operated by the thumb or finger of a hand.

In one aspect of the invention, a relatively rigid but flexible, elongated, stick-like member or shaft is securely mounted at its lower end and is adapted to be bent or flexed laterally of its longitudinal axis by the pressure of a thumb or finger at its upper end. Such bending or flexing can be in any direction along the radii of a circle having its center at the normal axis of the elongated member as is well known in "stiff-stick" controls, the essential difference being that the stick is bent or flexed by the presure of a thumb or finger rather than a hand grip. The control device, therefore, is adapted for mounting on the joystick, for example, of an aircraft or helicopter as well as on a panel or arm rest of a vehicle. At the same time, it avoids the disadvantages of a rotatable knob which may be similarly positioned but operates in a manner similar to a displacement type of control and is less accurate and less rapidly and readily operated than the force or pressure-operated control of the present invention.

As another aspect, the invention employs the use of a plurality of annularly arranged strain gauges which are readily and simply mounted on the bendable shaft or stick member and give very accurate control.

As a further aspect of the invention, the strain gauges comprise a solid-state semiconductor such as a single crystal of silicon or the like.

As still another aspect, the invention provides a flexible bellows-like seal for protecting the strain gauges.

The above and other objects, advantages and features of the invention will be apparent from the following description taken in conjunction with the accompanying drawings which illustrate an exemplary embodiment of the invention.

In the drawnigs:

FIG. 1 shows an application of the invention in which the control device is positioned in the hand grip of a joystick or the like for operation by a thumb;

FIG. 2 is an enlarged longitudinal sectional view of the thumb or finger-operated control of FIG. 1; and FIG. 3 is a view looking along the line 3—3 of FIG. 2.

Referring to the drawings and more particularly to FIG. 1, there is shown a hand grip 10 attached to a joystick control member 11 of an aircraft, helicopter, space vehicle or the like. Mounted in the upper portion of the hand grip 10 within a recess 12 is the control device or element 13 of the present invention. As shown in FIG. 1, the hand grip 10 and control device 13 are so positioned that a thumb of the hand gripping the joystick 11 may readily press the operating member 24 of the control device 13 in any lateral direction. It is not a matter of rotating a knob in predetermined directions or through predetermined angles, but merely a matter of moving the button or operating member 24 in a desired direction.

While the control device 13 is shown in FIG. 1 as being applied to an aircraft joystick, it will be apparent from the following description that it may be positioned on the panel or arm rest of a crane or any other type of vehicle or apparatus. It is illustrated in connection with an aircraft joystick because the mere pressure of the thumb gives accurate isometric control in any direction.

Referring now to FIG. 2, there is shown a base member 14 having an elongated flexible shaft or stick member 15 rigidly attached at its lower end to the base member as indicated at 16. A tubular housing comprising a member 17 is screw-threaded on the base member 14, and a member 18 is screw-threaded on the member 17. The member 18 is cup-shaped in form and has an opening 19 in the top thereof through which the shaft or flexible stick member 15 projects. The opening 19 is larger in diameter than the stick 15 to provide for lateral movement of the flexible stick in any direction. A disc or ring-like member 20 provided with a seal 24 surrounds the shaft or stick 15 and is attached thereto by a set screw 23 or the like. The seal 24 is not absolutely necessary.

A bellows 21 is attached at its upper end to the disc or ring 20 and at its lower end to a tubular flange 22 on the member 17, thereby providing a seal against the entrance of foreign matter to strain gauge elements hereinafter to be described, while permitting bending or lateral flexing of the shaft 15. The button or like projection 24 provided on the upper end of shaft or stick 15 is engageable by the operator's thumb and facilitates manual fingertip operation thereof.

Angularly spaced and mounted on shaft or stick 15 and below the sealing bellows 21 are a plurality of strain gauges 25 consisting of at least two pairs located on axes 90° apart. The strain gauges 25 are connected by leads 26 and 27 to connector clips 28 and 29 or the like, which in turn may be connected by leads 30 and 31 to terminals 32 and 33 and to an additional terminal 34 leading through the base 14.

The strain gauges, as above described, are preferably of the solid-state or semiconductor type and are also preferably formed from a single crystal of silicon or similar material. They are attached to the flexible shaft or stick member 15 by a suitable adhesive, cement or the like so as to be bent and strained under bending or flexing movement of the member 15, thereby distinguishing them from capacitor or like control elements.

As also above set forth, the strain gauges of the present invention are adapted for utilization in any type of well known electrical circuits, such as a full or half D.C.

or A.C. bridge network, to operate any desired control elements.

While an exemplary embodiment of an isometric control device has been shown and described, it will be apparent that changes may be made without departing from the spirit of the invention, and it is intended to be limited only by the scope of the appended claims.

What is claimed is:

1. In a strain gauge control device of the force-operated or "stiff-stick" type, the combination of an elongated control stick, tubular hand grip means arranged on one end of said stick and forming an extension thereof, tubular housing means in the free end of said hand grip extending anqularly relative thereto, elongated flexible shaft means in and anchored at one end of said housing means and projecting from the other end therof, a plurality of strain gauge means arranged on and secured to said shaft means and operable upon flexing and bending said shaft means, means connecting each of said strain gauge means to electric circuit means to provide signals in response to lateral bending and flexing of said shaft means, and button means on the free end of said shaft means adaptable to be engaged by the thumb of the operator's hand when the latter grasps said hand grip whereby said stick means is manually moved laterally in a plurality of directions by said thumb.

2. A control device as set forth in claim 1 in which said strain gauge means comprises a solid-state semiconductor.

3. A control device as set forth in claim 2 in which said solid-state semiconductor comprises a single constituted crystal of silicon.

4. A control device as set forth in claim 1 wherein a flexible bellows-like sealing means movable with said flexible shaft means provides for sealing said strain gauge means from entrance of foreign matter.

References Cited

UNITED STATES PATENTS

| | | | |
|---|---|---|---|
| 2,858,126 | 10/1958 | Gomez | 74—18.1 |
| 2,941,407 | 6/1960 | Huber et al. | 74—18.1 |
| 3,232,126 | 2/1966 | Pucciarello et al. | |
| 3,327,270 | 6/1967 | Garrison | 338—5 |

FOREIGN PATENTS 687,823    2/1953    Great Britain.

REUBEN EPSTEIN, *Primary Examiner.*

U.S. Cl. X.R.

244—83; 338—2